UNITED STATES PATENT OFFICE.

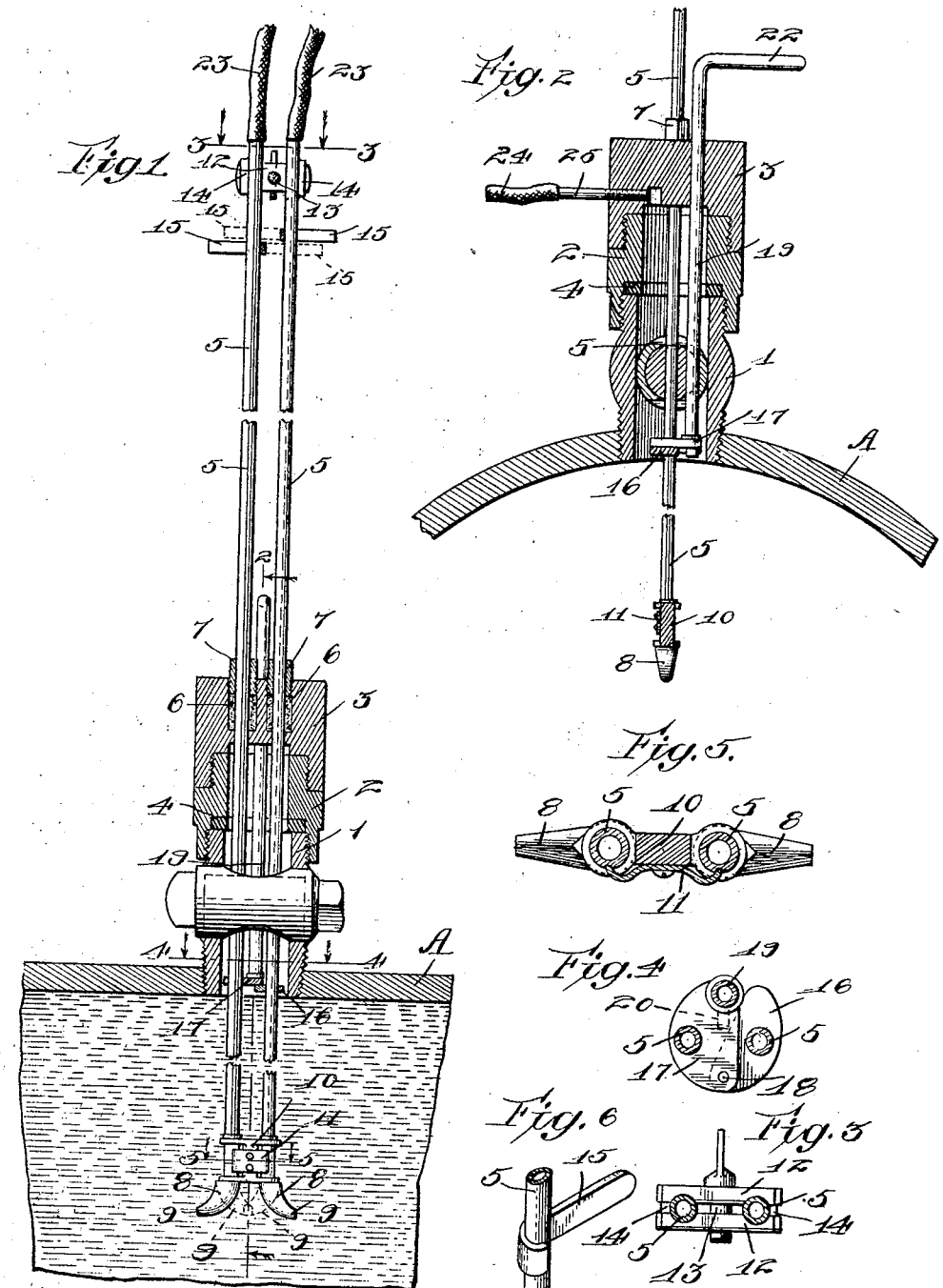

EDWARD S. COLE, OF UPPER MONTCLAIR, NEW JERSEY.

DEVICE FOR USE IN CONNECTION WITH VELOCITY-METERS.

No. 803,880.     Specification of Letters Patent.     Patented Nov. 7, 1905.

Application filed July 2, 1904. Serial No. 215,204.

*To all whom it may concern:*

Be it known that I, EDWARD S. COLE, a citizen of the United States, residing at Upper Montclair, in the county of Essex and State of New Jersey, have invented a certain new and useful Improvement in Devices for Use in Connection with Velocity-Meters, of which the following is a full, clear, concise, and exact description, reference being had to the accompanying drawings, forming a part of this specification.

My invention relates to devices for measuring the velocity of flow of flowing streams; and it relates in particular to means for connecting such devices with the mains or pipes in which the streams are flowing.

Prominent objects of my invention are to provide a simple, practical, and inexpensive device for connecting such meters with the pipes or mains, to arrange for the ready and easy attachment of such devices to the mains and the quick and easy detachment of the same therefrom, to adapt the device for use on large mains, and to secure the foregoing and other desirable results in a simple and expeditious manner.

In the accompanying drawings, Figure 1 is a view of a connecting device embodying my present invention, together with a portion of a main to which the device is attached. Fig. 2 is a view taken on line 2 2 in Fig. 1. Figs. 3, 4, and 5 are cross-sections taken on lines 3 3, 4 4, and 5 5, respectively, in Fig. 1. Fig. 6 is a detail of construction.

In Fig. 1 I have shown a water-main A, in which flows a stream of water whose velocity it is desired to measure. Instead of a water-main any other pipe or main can have the device applied to it. The water-main is provided with an aperture, and into this fits a plug 1, which is conveniently screw-threaded, so as to permit its ready attachment to and detachment from the main A. A nut 2 is fitted to the upper or outer end of the plug 1, and a cap 3 is fitted to the outer end of the plug 2, these parts being respectively screw-threaded together for convenience of connection and disconnection. Between the plug 1 and nut 2 is a washer 4. A pair of tubes 5 5 is extended through the plug 1, nut 2, and cap 3 and into the interior of the pipe or main A. The cap 3 is provided with stuffing-boxes 6 6, having bushings 7 7, by which a water-tight joint with the tubes 5 5 is made. The lower ends of the tubes 5 5 are constructed with bent ends 8 8, having orifices 9 9, arranged to extend longitudinally in the pipe or main A. The lower ends of these tubes 5 5 are connected together by a yoke or crosspiece 10, which embraces both of said tubes. A spring 11 is secured to the yoke 10, and its outer ends are arranged to engage grooves in the tubes 5 5, as shown in Fig. 5. The tubes 5 5 are loose in the cap 3 and also in the yoke 10, so that they can be freely turned or rotated so as to cause the bent ends 8 8 to face outward, as shown in full lines in Fig. 1, or to face inward—that is, toward one another, as shown in dotted lines in said figure. A clamp conveniently consisting of a pair of plates 12 12 and a thumb-screw 13 is arranged upon the upper ends of the tubes 5 5, so that by adjusting the thumb-screw 13 the clamp can be tightened upon the said tubes, so as to prevent their rotation, or can be loosened, so as to permit such rotation. Wings or side projections 14 14 are secured to or formed upon the tubes 5 5, so that they are engaged by the clamping members 12 12 to assist in the clamping action and also to hold the tubes in proper position, the wings 14 14 being on the same sides of the tubes as the bent ends 9 9. The tubes 5 5 are also desirably provided with clips or vanes 15 15 on the same sides of the tubes to serve as handles to assist in turning the tubes and also as vanes or indicators to indicate the positions of the bent ends or orifices 9 9.

A spreading device for spreading or separating the tubes 5 5 from one another is desirably provided. It conveniently consists of a pair of plates 16 and 17, arranged upon the tubes 5 5 and pivoted together at 18. A rod 19, having a projection 20, adapted to act upon the plate 16, is extended down through the parts 1, 2, and 3 and provided at its upper end with a handle 22, so that it can be readily turned by hand by a person using the device.

The tubes 5 5 are connected with flexible tubes or connectors 23 23, which are understood to extend to some form of velocity measuring or indicating device. As this device can be of any particular form or variety and forms no part of my present invention, it is not shown herein. Another tube 24 is shown connected with a pipe 25, attached to the cap 3, this being also provided for the recording device.

In using the device the pipe A is provided with a threaded aperture, if such is not already provided, and then the plug 1 is screwed into such aperture. The connecting device is then attached to the plug 1 by the screwing of the nut 2 upon said plug, the nut 2 and cap 3 being previously screwed together. This attachment of the nut 2 to the plug 1 is permitted by first turning the tubes 5 5 so that their bent ends 8 8 extend or face inwardly and then inserting said ends and the lower portions of the tubes through the nut 2 and plug 1, which insertion, it will be seen, is permitted by the fact that when the tubes are so turned their bent ends do not project outwardly. After the tubes are thus inserted and the nut 2 and cap 3 secured in position the tubes 5 5 are turned one hundred and eighty degrees, so as to cause their bent ends 8 8 to face outwardly, as shown in Fig. 1. This can be determined by the vanes 15 15. The clamping members 12 12 are then adjusted so as to hold the upper ends of the tubes firmly against further rotation. The spring 11 engages the grooves in the lower ends of the tubes, and thus holds these ends firmly against rotation. The handle 22 of the rod 19 is then turned so as to cause the projection 20 on said rod to act against the plate 16, and thereby separate the tube 5, inclosed by said plate slightly from the other tube. This separation of the tubes tends to hold them in a rigid condition and also tends to bind them in position in the cap 3 to prevent longitudinal movement of the tubes in said cap. In this way after the tubes have been inserted in position in the main they can be held firmly and rigidly or, it may be said, can be trussed to prevent their being bent or swung or being rotated in the main A. This is desirable because in water-mains, especially in large mains, the flow of water is likely to bend or swing the tubes out of a perpendicular and true line or to cause a swinging or vibrating motion of the tubes in one way or another. This is especially likely to occur in large mains, because the tubes must be of considerable length to extend well into those mains, and hence the tubes being of considerable length are more subject to the force exerted by the flow of water. By my invention, however, the tubes are held firmly together and in their proper positions and do not swing or become dislocated in the main. They are also kept "edge on"—that is to say, the orifices 9 9 are maintained in their desired conditions, one pointing up and the other down stream. The tubes can also be locked in any position to which they are adjusted in the main—that is, in an up and down position—by spreading them, so as to lock or bind them in the cap 3.

In Fig. 1 the tubes are shown inserted only part way into the main. When inserted to their full extent, their lower ends extend down much farther into the main and a much smaller portion remains above the cap 3. The plates 16 17, it is understood, are loose upon the tubes 5 5, so that the latter can be inserted down to any desired position in the main without affecting the operability of the spreading device.

It will be understood that changes and modifications can be made in the device herein shown without departing from the spirit of my invention.

What I claim is—

1. The combination with a pair of tubes adapted for use in connection with meters for flowing streams, of means for connecting said tubes together, the tubes being rotatable relatively to said means, and a spring for holding the tubes against rotation, substantially as described.

2. The combination with a pair of tubes provided with bent ends, of a yoke connecting the tubes together, the tubes being rotatable relatively to the yoke and provided with grooves, and a spring carried by the yoke and adapted to engage said grooves, substantially as described.

3. The combination with a pair of tubes, of supporting or holding means therefor, and means for spreading or separating the tubes from one another to cause them to bind in the holding means, substantially as described.

4. The combination with a pair of tubes, of a pair of plates on said tubes, said plates being pivoted together, and means for swinging the plates apart so as to spread the tubes, substantially as described.

5. The combination with a pair of tubes, of a pair of plates 16 and 17 carried thereby, said plates being pivoted together at 18, and a rod 19 provided with a projection 20, said rod being carried by one of the plates and arranged to act upon the other to separate the tubes, substantially as described.

6. The combination with a main or conduit, of a pair of tubes provided with bent ends adapted for insertion therein, a tubular member attached to the conduit and provided with means for supporting or holding the tubes, the latter being independently rotatable, whereby they can be turned to swing their bent ends inwardly, and the tubular member having an orifice of such size that the tubes with their ends turned in can be drawn or passed through it, whereby the tubes can be inserted in and withdrawn from the main or conduit through such tubular member, substantially as described.

7. The combination with a main or conduit, of a pair of tubes provided with bent ends, means for connecting the ends of the tubes together, a plug 1 connected with the main or conduit, a detachable member 3 detachably connected with the plug 1 and supporting the tubes, the latter being independently rotatable, whereby their bent ends can be turned in and the aperture or orifice of the plug 1 being of such size as to permit the passage of the tubes with their ends turned in, through it, and means for locking the tubes against rotation, substantially as described.

8. A device of the class specified, comprising a pair of tubes having bent ends providing orifices, means for connecting the ends of said tubes together, a member 3 adapted for attachment and detachment to the main or an attaching member thereon, the tubes being independently rotatable, and means for locking the tubes against rotation, substantially as described.

9. A device of the class specified, comprising a pair of independently-rotatable tubes having bent ends forming orifices, a yoke connecting said tubes together near their bent ends, a spring carried by said yoke and adapted to engage the tubes to hold them against rotation, the tubes being provided with means for engaging the spring, an attaching member 3, a clamp consisting of clamping members 12, 12, and an adjusting-screw 13 for clamping the tubes against rotation, and vanes 15, 15, on said tubes, substantially as described.

10. A device of the class specified, comprising a pair of independently-rotatable tubes having bent ends and provided with grooves, a yoke connecting said tubes together near their bent ends, a spring carried by said yoke and adapted to engage the grooves in said tubes, a clamping device for engaging the other ends of the tubes and locking them against rotation, an attaching member 3, and a spreading device consisting of plates 16 and 17 mounted loosely on the tubes and pivoted together at one end, and a rod 19 having a handle 22 extended through the member 3 and provided with a projection 20 adapted to act against one of the plates 16, 17, said rod being connected with the other plate, substantially as described.

In witness whereof I hereunto subscribe my name this 16th day of June, A. D. 1904.

EDWARD S. COLE.

Witnesses:
   HENRY C. VAN CLEET,
   F. W. BAYLES.